United States Patent [19]
Logan et al.

[11] Patent Number: 5,740,423
[45] Date of Patent: Apr. 14, 1998

[54] SYSTEM AND METHOD FOR ACCESSING DISTRIBUTED DATA ON A PLURALITY OF DATABASES

[75] Inventors: James Richard Logan, Parker; Kurt Deshazer, Littleton, both of Colo.

[73] Assignee: CSG Systems, Inc., Englewood, Colo.

[21] Appl. No.: 579,788

[22] Filed: Dec. 28, 1995

[51] Int. Cl.$^6$ .................................................. G06F 17/30
[52] U.S. Cl. ........................... 395/610; 395/604; 395/601
[58] Field of Search .................................. 395/601, 604, 395/610, 614, 615, 603

[56] References Cited

U.S. PATENT DOCUMENTS

| | | | |
|---|---|---|---|
| 4,731,734 | 3/1988 | Gruner et al. | 395/412 |
| 4,811,207 | 3/1989 | Hikita et al. | 395/612 |
| 4,864,497 | 9/1989 | Lowry et al. | 395/613 |
| 5,012,405 | 4/1991 | Nishikado et al. | 395/610 |
| 5,263,167 | 11/1993 | Connor, Jr. et al. | 395/604 |
| 5,276,870 | 1/1994 | Shan et al. | 395/613 |
| 5,325,290 | 6/1994 | Cauffman et al. | 395/234 |
| 5,361,349 | 11/1994 | Sugita et al. | 395/608 |
| 5,446,886 | 8/1995 | Li | 395/603 |
| 5,513,348 | 4/1996 | Ryu et al. | 395/610 |
| 5,515,531 | 5/1996 | Fujiwara et al. | 395/610 |
| 5,551,027 | 8/1996 | Choy et al. | 395/610 |
| 5,581,758 | 12/1996 | Burnett et al. | 395/614 |

*Primary Examiner*—Paul V. Kulik
*Attorney, Agent, or Firm*—Baker & McKenzie

[57] ABSTRACT

A system for accessing data distributed on databases in an integrated computer system includes a distributed data port, which initiates a XRef server query, generates a virtual table having a first result set including at least one data row responsive to the XRef server query, initiates Populate queries each having one of the data rows as an argument, and updates the virtual table with data responsive to the Populate queries. The system also includes a XRef server, which receives the XRef server query from the distributed data port and identifies at least one of the databases having a data row responsive to the XRef server query. A temporary virtual table relays each Populate query to a data directory server, and the data directory server is linked to each of the databases. It locates at least one of the databases having data responsive to the XRef server query and the Populate query, retrieves that data, and transmits data responsive to said XRef query to the distributed data port and data responsive to the Populate query to a temporary virtual table. The temporary virtual table populates each data row of the result set with data responsive to the Populate query and transmits the populated data row to the distributed data port to update the virtual table.

8 Claims, 3 Drawing Sheets

SYSTEM AND METHOD FOR ACCESSING DISTRIBUTED DATA ON A PLURALITY OF DATABASES

BACKGROUND OF THE INVENTION

1. Field of the Invention

The invention relates to systems and methods using multi-query populates to access data distributed on a plurality of databases and to combine the results. In particular, the invention relates to systems and methods using the combination of a XRef server query to identify the data rows in a result set and a Populate query to retrieve data to populate those data rows in a virtual table (VTab).

2. Description of the Related Art

With the increasing demand for the rapid processing of transactions, as well as the ever-increasing size of databases against which these transactions are processed, transaction processors have turned to distributed database systems to accomplish their goals. For purposes of this application, the term "distributed database" refers to a database system in which data may be located in more than one physical location or in more than one database, or both. In some cases, data may be distributed such that certain data is located in only one database while other data is located in more than one database. Often, more than one client or user desires access the data simultaneously. Frequently, many users require simultaneous or near simultaneous access. This presents a problem in that only a limited number of access requests can be processed at a time.

Access requests to databases generally are one of two types. The first is termed a "query" and is generally associated with a request to read data from the database(s). The second is termed an "update" and is generally associated with a request to write data to the database(s). The present invention deals primarily with the former type of request.

Various problems exist with distributed database systems. For example, as noted above, in some cases, multiple clients or users may request access to particular data at the same time. Typically, each data server may process one request or a series of transactions at a time. Thus, if multiple requests are made to one server at the same time, not all of the transactions can be processed at the same time. When this occurs the latter requests are generally queued or have to be resubmitted at a later time. This causes undesirable delays in the processing of these transactions. Other factors also may contribute to delays in processing such transactions. As a result, in some cases, one or more data servers may be idle while another is backlogged with multiple requests. This is an inefficient use of resources.

In an attempt to address these types of problems, some systems have used different schemes to attempt to balance the distribution of requests among the multiple servers. According to one arrangement, particular clients or users are permanently associated with particular servers. The theory behind this design is that by randomly limiting the number of clients accessing a particular data server, some minimization of the bottleneck effect may occur. According to another approach, multiple copies of particular data may be stored in more than one database.

These schemes, however, generally suffer from at least three drawbacks. First, many of the systems electing the first scheme are architected, so that particular clients or users are "hard-wired" to particular servers. In such a case, clients in the system will not generally have access to the full complement of servers available in the system which are capable of processing the particular transaction. As a result, uneven load distribution may still occur since a server which is free to service a request may not be called upon to do so because the requesting client may not have access to the free server.

A second major drawback to both of the prior art data distribution schemes described above is the significant time and cost of processing information which is necessary to determine the best way to allocate data requests. In some cases, particularly when the number of transactions to be processed is low and the complexity of the allocation scheme is high, the system may perform more efficiently without a real-time decisional process.

Third, in the case of distributed database systems containing redundant data (e.g., the second scheme), the availability of secondary storage (i.e., disk storage) is significantly decreased by virtue of the redundancy of the data. Often data redundancy is not a possibility because of severe limitations in storage capacity within an enterprise.

The telecommunications industry and, in particular, the cable television industry have a great need for storage and manipulation of large amounts of data. Cable television system operators typically maintain large databases containing a variety of subscriber, product and billing information. Typical classes of information managed by cable companies include subscriber accounts, available products and their pricing structure, physical assets and their functionality, and marketing data. It is often desirable to distribute this information across a network of databases whether or not they are located at the same physical location.

The processing requirements for cable based systems can be staggering. For example, it may be necessary to provide twenty-four hour per day, seven day per week service for a subscriber base of millions or evens tens of millions of subscribers. In addition, such systems may be called upon to execute hundreds or thousands of transactions per second (TPS). In addition, such systems may be required to support thousands of interactive users operating client terminals (e.g., Customer Service Representatives (CSRs)), many of which may be concurrent users. It is further anticipated that the average customer record may soon be on the order of about fifteen kilobytes requiring a total database capacity of about 225 Gigabytes (assuming about fifteen million subscribers).

Known distributed database systems that may be employed by a system operator may include a plurality of transaction generators or terminals, which may be operated by CSRs to acquire access to data contained within the system. Each of the transaction generators communicates either directly or through a communications controller with a particular associated server or servers. Communication techniques and protocols which are known in the art are employed to allow the transaction generators to communicate with the servers. For example, an Ethernet™ system operator may be used when both client and server are PC-based processors.

Nevertheless, difficulty arises in such systems when access to data residing at differing locations is required. This places a burden on the CSR (or a transaction generator in general) because it may impose additional processing requirements to keep track of what data is accessible to a particular CSR and which is not. Additionally, if certain data is needed, but not accessible to a particular CSR, it may be necessary to determine where the data is located and which CSR may have access to that data.

Method of data distribution, for example, of customer records are known. In a horizontal data distribution, each of the customer records is completely contained on one physical server while the whole of its associated database and the enterprise domain of all customers is spread across all servers. It is also possible, however, to distribute data in a vertical manner wherein different aspects of a customer's account resides on different physical servers.

SUMMARY OF THE INVENTION

Thus, a need has arisen for systems and methods for accessing data distributed over a plurality of databases and for combining the results as with a single data access. Further, a need has arisen for system and methods for accessing distributed data that access a minimal number of databases that include data to be produced as part of a final result set. In addition, a need has arisen for systems and methods, which can more quickly assess data distributed over a plurality of databases, thereby reducing the time any request prevents other requests from accessing those databases.

In an embodiment, the invention is a system for accessing data distributed on a plurality of databases in an integrated computer system. The system may comprise a plurality of databases and a distributed data port, which (1) initiates a XRef server query, (2) generates a virtual table having a first result set including at least one XRef data row responsive to the XRef server query, (3) initiates at least one Populate query each having one of the at least one data rows as an argument, and (4) updates the virtual table with data responsive to the at least one Populate query. A XRef server receives the XRef server query from the distributed data port, identifies at least one of the plurality of databases having at least one of the data rows, and transmits the XRef server query to the data directory server. A temporary virtual table relays each of the at least one Populate queries to the data directory server. The data directory server is linked to each of the plurality of databases, locates at least one of the plurality of databases having data responsive to the XRef server query and the Populate query, retrieves the data, and transmits data responsive to the XRef server query to the distributed data port and data responsive to the Populate query to a temporary virtual table. The temporary virtual table then populates each of the at least one XRef data rows of the result set with data responsive to the Populate query and transmits the populated data row to the distributed data port to update the virtual table. The system may further comprise a printer, monitor, or other means for displaying the virtual table.

In another embodiment, the invention comprises a method for accessing data distributed on a plurality of databases. The method may comprise the steps of initiating a database query that retrieves at least one XRef data row, generating a virtual table having a first result set including the at least one XRef data row, initiating at least Populate query having each of the at least one XRef data rows- as an argument, and generating a temporary virtual table that populates each XRef data row of the result set with data responsive to the Populate query. Further, the Populate query may define a single distributed data set, thus avoiding duplication of rows. The virtual table then may be updated with the populated data row.

This method may further comprise the steps of displaying the virtual table using, for example, a printer or a monitor, and ordering the XRef data rows.

It is a technical advantage of systems and methods of this invention that the results of the XRef server query and the Populate query are appended together and create a single result set that is the combination of all of the result sets from the distributed data. It is a further technical advantage that the systems and methods of the present invention may be used with numerous data ports associated with commercially available Generic Libraries (GL), such as the Sybase® libraries: "DB-Lib" and "CT-Lib." It also is a technical advantage of systems and methods of the present invention that more users may access data distributed over a plurality of databases because completion of individual requests is accelerated.

Other objects, feature, and technical advantages are readily apparent to persons skilled in the relevant art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF PREFERRED EMBODIMENTS

Figure 1:
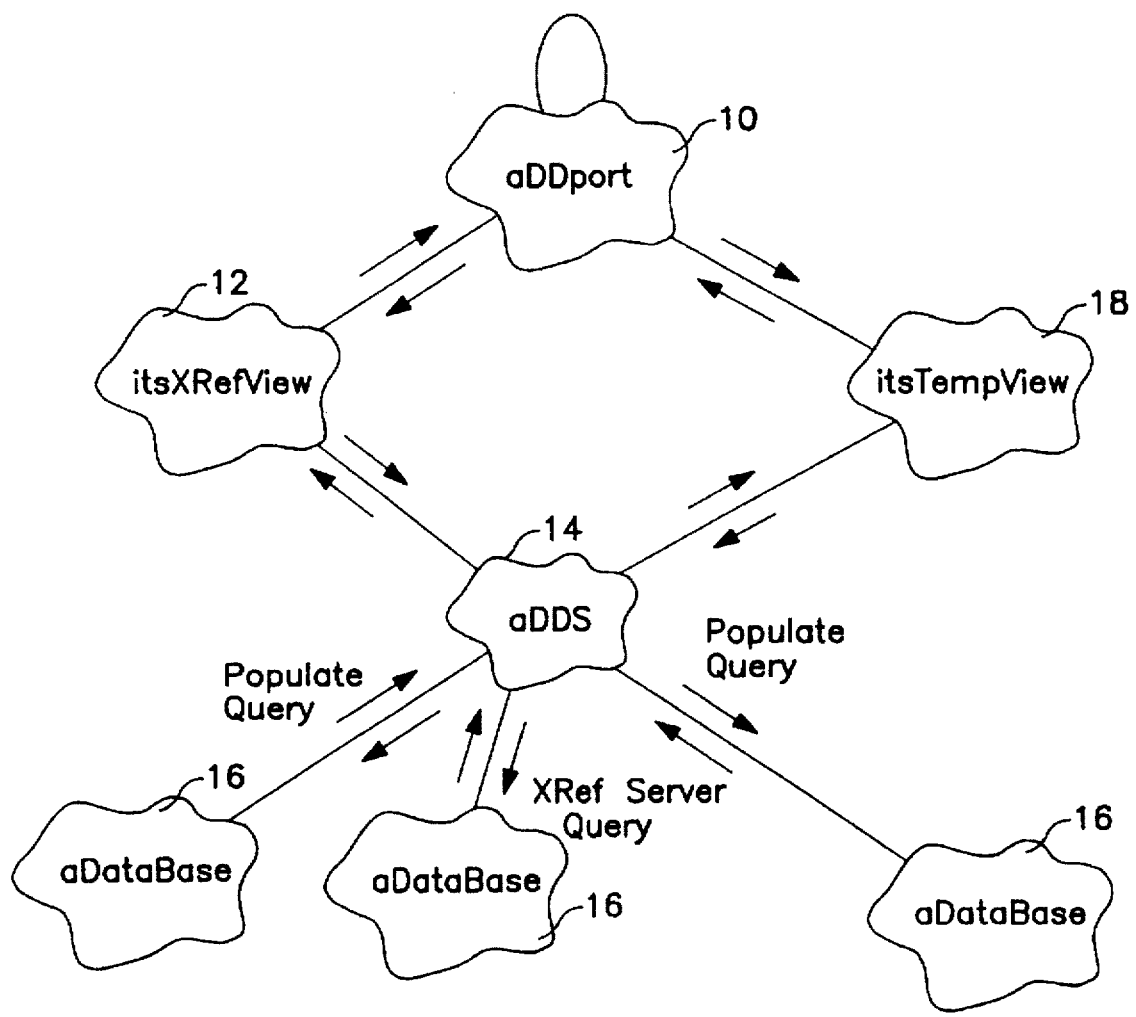
FIG. 1 is a flow chart depicting the operation of the system and method of the present invention.

FIG. 1 is a flow chart depicting the operation of the system and method of the present invention. This figure depicts a Scenario Model of the present invention employing a Booch Methodology flow chart to describe the operation of the invention from a procedural orientation. Referring to FIG. 1, a distributed data port 10 is shown, from which a XRef server query initiates. The XRef server query generates an internal field data structure, itsXRefView 12. ItsXRefView 12 eventually contains the data rows retrieved when the XRef server query is relayed to one of Databases 16 via at least one Data Directory Server (DDS) 14. Thus, FIG. 1 shows a first query that is initiated in Distributed Data Port 10 being routed to appropriate Database 16, and data rows of the result set being returned to its XRefView 12 for use by Distributed Data Port 10.

Data Directory Server

Each of the DDSs has communication access to all of the other DDSs as well as to each of database. DDSs serve three primary functions. After receiving a query, the selected DDS first locates the appropriate/available database for the further processing of the query, forwards the query, and then receives the fulfilled query and forwards it to the distributed data port or the temporary virtual table.

The distributed data port must connect to a DDS prior to accessing data. Through the use of internal rules, the DDSs determine how a query should run in order to complete processing of a data request. Access to the DDSs may be efficiently implemented through the use of remote procedure calls (RPCs) which are identified in tables internal to the DDS. Any of a plurality of standards for such RPCs may be used with the current invention.

The DDS(s) are preferably open server applications that provide a mechanism to direct any data query to an appropriate database to service the query. Specifically, DDSs may be open servers comprising the same or similar hardware as the databases of the present invention. Alternatively, DDSs may be configured differently from the databases. DDSs function to analyze a query and, based upon the request type and on an internal set of rules, direct the query to the appropriate database. The types of queries, which are received at DDSs, are based upon a set of stored procedures recognizable to DDSs.

Prior to discussing the specifics of database queries according to the methods and systems of this invention, it is to be understood that DDSs preferably operate according to a limited number of event handlers responsible for processing the queries initiated by the distributed data port, as well as internal queries generated as a result of DDS processing itself. For example, the event handlers may include, but are not limited to, the following:

1. Start Handler—The start handler provides a convenient and central location for installing any other event handler routines, building any tables necessary for processing queries and for installing any other services that the DDS requires for its functionality.
2. Stop Handler—The stop handler is executed when a request to shut down the system has been received through a particular request or as a result of certain system conditions.
3. Connect Handler—The connect handler is executed whenever the DDS receives a query..
4. Disconnect Handler—The disconnect handler is executed whenever an active connection to the DDS is terminated.
5. Language Handler—The language handler is executed whenever an application issues a language statement to the DDS. The language handler in the DDS does nothing because all queries are required to be either registered procedure calls or remote procedure calls.
6. RPC Handler—The Remote Procedure Call handler carries the bulk of the load borne by the DDS and is the most important handler for purposes of this discussion. Any query which is not registered in the DDS registered procedure table will generate an RPC handler event where the query is analyzed by the RPC event handler and acted upon accordingly.
7. Error Handlers—Several error handlers are installed in the DDS application to provide information on any failure from the components of the DDS. All error messages are logged in the DDS.
8. Attention Handlers—An attention handler is installed to handle disconnects. The DDS has been set up to cause all disconnects to generate an attention event in order to determine if the connection to the DDS has been interrupted.

The functionality comprising the operation of the DDS may be categorized into three separate classes—the main function, the local DDS registered procedures, and the utility functions. The main function provides the entry point for all executable C programs. Although the preferred embodiment is formulated using the C and C++ languages, the invention described herein is by no means limited to such a design. The error handlers and the start handler are installed in the main function body. These include a set of routines which serve to parse input parameters and configuration file attributes in order to set up any DDS properties. The network listening function is spawned in the main function body and sleeps until the DDS application is terminated either normally or abnormally.

The DDS application is dependent on several global data tables. These global tables are used to control the navigational decisions that the RPC Handler needs to direct the requests to the appropriate database in order to complete the data query.

The Open Server Install Registered Procedures, os_install_reg_procs (), function provides a central installation point for all registered procedures on the DDS and is grouped in the start handler classification. All of the event handlers and supporting system functions provide a trace log of activities in a locally maintained log file. This file is preferably truncated every time the DDS application is started.

XRef Servers

A system for accessing data distributed on a plurality of databases in an integrated computer system also includes one or more XRef Servers which function as a resource available to DDSs for determining where specific data resides in the system and for storing a rules database to be loaded into DDSs at DDS start-up. Further, the XRef Servers may contain a variety of global tables which are continually updated as data is added, updated, and deleted within the system.

Once the XRef server query has generated a virtual table virtual table having a first result set including at least one XRef data row responsive to said XRef server query. Populate queries are executed, each having one of the at least one data rows as an argument. A temporary virtual table, its TempView 18, is used to updates the virtual table with data responsive to the at least one Populate query. Populate queries for each successive data row in the result set are relayed by itsTempView 18 to at least one of the other of Databases 16 via Data Directory Server 14. Data responsive to the Populate query is returned to itsTempView 18. This temporary virtual table then populates each of the at least one XRef data rows of the result set with data responsive to the Populate query and transmits the populated data row to Distributed Data Port 10 to update the virtual table, its View.

Figure 2:
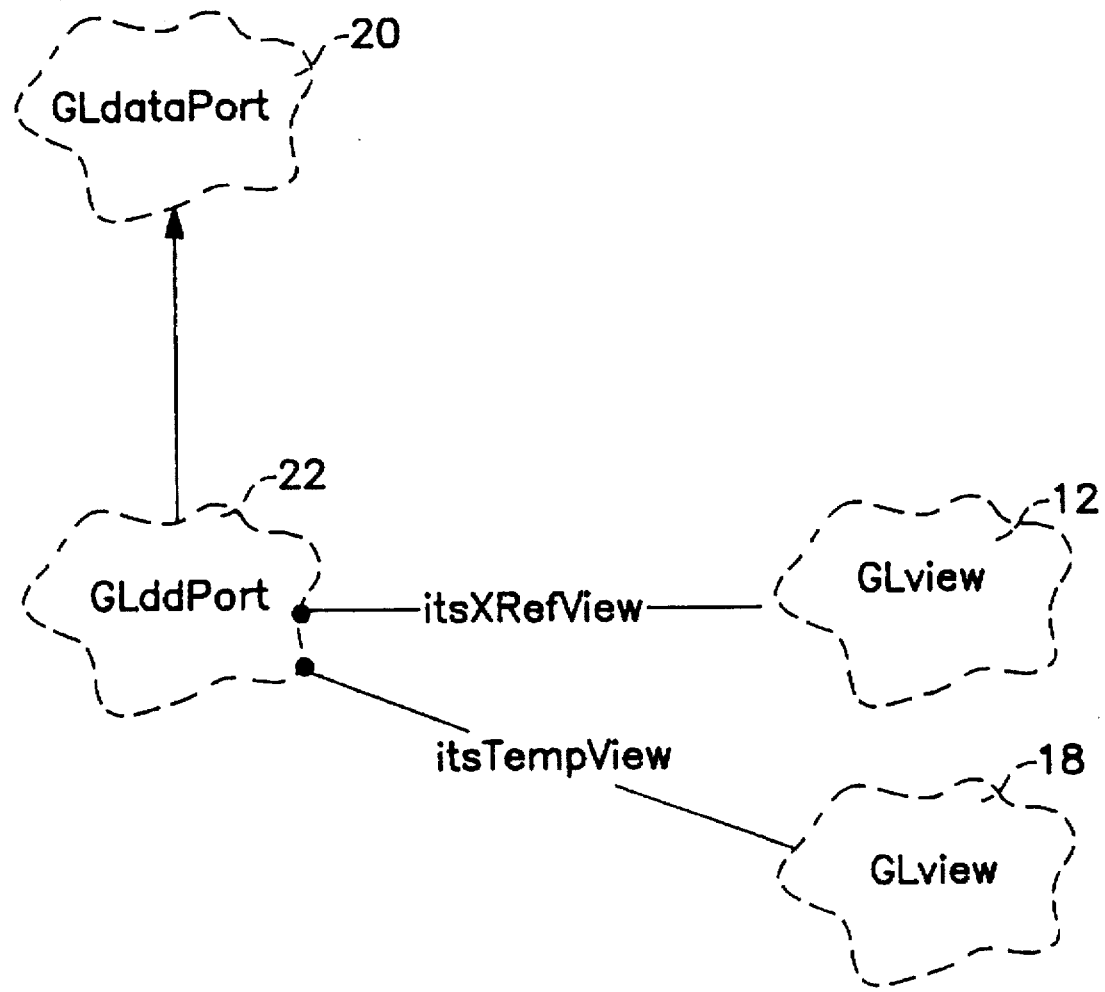
FIG. 2 is a class diagram of a resource file in accordance with the present invention.

Referring to FIG. 2, a class drawing depicts the structural and functional relationships between the classes of the present invention. GLddPort Class 22 is shown to inherit all of the functionality of GLdataPort Class 20 and two other sources described in FIG. 1: itsXRefView 12—the XRef data row result set generated by the XRef server query—and itsTempView 18—the temporary virtual table created to receive the results of the Populate query for each XRef data row.

Figure 3:
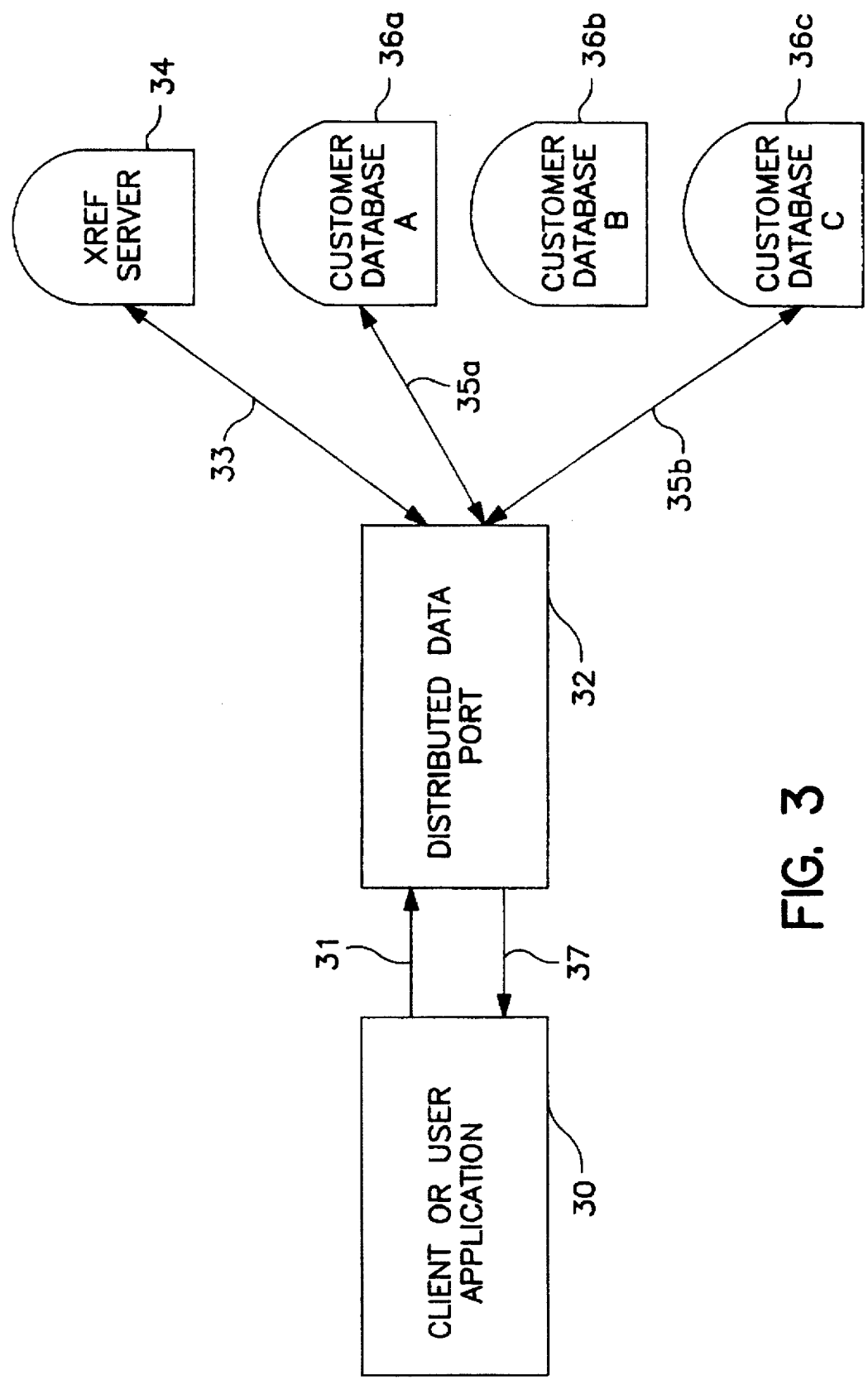
FIG. 3 is a schematic drawing of the system of the present invention.

Referring to FIG. 3, a schematic diagram of the system of the present invention is depicted. In FIG. 3, a client or user application 30 delivers a request 31 for distributed customer data to a Distributed Data Port (DDP) 32. Based on request 31, DDP 32 initiates a XRef server query 33 which is delivered to XRef server 34. XRef server 34 may have access to a plurality of XRef databases (not shown). As noted above, in response to XRef server query 33, XRef server 34 determines where, i.e., in which database(s), specific distributed data sought by application 30 resides within the system. XRef server 34 then returns a result set including XRef row data to DDP 32, and DDP 32 initiates Populate queries to retrieve the data from the data locations identified by XRef server 34.

For example, although there may be three Customer Databases 36a–c, the result set returned by XRef server 34 may indicate that the distributed data sought by application 30 resides only within Customer Databases 36a and 36c. Thus, DDP 32 would direct Populate queries 35a and 35c to Customer Databases 36a and 36c. As noted above, Populate queries 35a and 35c use the XRef data rows returned by XRef server 34 as their arguments and repeatedly retrieve data from Customer Databases 36a and 36c. The results of Populate queries 35a and 35c are returned to DDP 32 until a virtual table (VTab) 37 of the requested distributed data is complete. VTab 37, which contains the combined results of the application of XRef server query 33 to XRef server 34 and Populate queries 35a and 35c to Customer Databases 36a and 36c, respectively, is then returned by DDP 32 to application 30.

EXAMPLE

The present invention may be further understood by considering the following example, which is intended to be purely exemplary of the use of the invention. According to the invention, a distributed database query is handled in two phases. In the first phase, an XRef server query is initiated to retrieve XRef information. For example, the invention may be used to generate a table of customer ids that satisfy specific search criteria. In the second phase, a Populate query is executed that uses XRef information from the XRef server query to bind parameters. The Populate query is executed once for each row in the XRef server query's result set. The results from the execution of the Populate query are appended to each XRef row to create a single result set, i.e., a virtual table, that is the combination of all the result sets from distributed data.

As noted above with respect to FIG. 2, in order to use the Distributed Data Port Class, the operator inherits from it, and the .rc file may appear as in Table 1. Referring to Table 1, the XRef server query is described as follows:

```
(Random.Compile
    Name: "RandomTestMod.Random"
    Version: 8
    Flags: 0x0001
    View: "RandomTestMod.RandomView"
    XRefQuery: "1p_get_serv_loc_cust_set :
    addr_id"
    ArgStrings: "cust_id"
).
```

Similarly, the Populate query is defined as follows:

```
(Qry.Compile
    Name: "RandomTestMod.GetRandom"
    Version: 8
    Flags: 0x0001
    QueryName: "Populate"
    TableName: "RandomTestMod.RandomTable"
    CommandStr: " "
    QueryLoc: 1
    TableOpt: 1
    StringData: "1p_get_product_subscriptions: cust_id, :
    addr_id"
).
```

In the foregoing example, the "Random" Class inherits from "GLddPort," and the "RandomTestMod. Random" has two fields that were not in the "GLddPort"Class. The first new field:

XRefQuery: "1p_get_serv_loc_cust_set:addr_id"

defines the query that retrieves the XRef information. It uses the known binding information provided by the GLddPort Class and dynamically builds a result set virtual table (VTab). The second new field:

ArgStrings:"cust_id"

defines the retrieved columns from the foregoing XRef query that the operator desires to bind to the Populate query. In this example, "cust_id" is a column name in the result set from the XRef server query and is bound to the :cust_id argument in the Populate query. The C++ source code also inherits from the GLddPort Class. The Update, Insert, and Delete methods will operate for the "Random" Class, in the same manner that they did for the GLddPort Class. The new class only modifies the Populate method.

In particular, the Populate query is designed to retrieve the rows appropriate for one distributed data set. In this example, the Populate query is designed to return the result set for a single customer. Consequently, if the Populate query is not limited to a single distributed data set, duplicate rows may be generated in the final result set. Moreover, because the data returned by the XRef server query is ordered by the rows identified by that original query, tailored comparison and GL sorting methods are used to select new row orders.

TABLE 1

```
(RClas.Compile
    Name: "Random"
    Parent: "GLddPort"
    Module: "RandomTestMod"
    Version: 8
    Flags: 0x0800
)
(Qry.Compile
    Name: "RandomTestMod.GetRandom"
    Version: 8
    Flags: 0x0001
    QueryName: "Populate"
    TableName: "RandomTestMod.RandomTable"
    CommandStr: " "
    QueryLoc: 1
    TableOpt: 1
    SringData: "1p_get_product_subscriptions:
    cust_id, :addr_id"
)
(Random.Compile
    Name: "RandomTestMod.Random"
    Version: 8
    Flags: 0x0001
    View: "RandomTestMod.RandomView"
    XRefQuery: "1p_get_serv_loc_cust_set :
    addr_id"
    ArgStrings: "cust_id"
)
(VTab.Compile
    Name: "RandomTestMod.RandomTable"
    Version: 8
    Flags: 0x0001
    Columns: "random_test.cust_id,
    0x00000005,0x0000000a,0x00000000"
    Columns: "random_test.cust_name,
    0x00000002,0x0000001e,0x00000000"
    Columns: "product.prod_cat_cd,
    0x00000002,0x00000005,0x00000000"
    Columns: "product.prod_type_cd,
    0x00000002,0x00000005,0x00000000"
    Columns: "product.offer_meth_type_cd,
    0x00000005,0x0000000a,0x00000000"
    Columns: "prod_rate.rate_amt,
    0x0000000a,0x0000001e,0x00000000"
    Columns: "prod_rate.busn_prd,
    0x00000002,0x00000005,0x00000000"
    Columns: "serv_loc_prod.prod_install_date,
    0x0000000c,0x00000008,0x00000000"
    Columns: "serv_loc_prod.prod_discontinue_date,
    0x0000000c,0x00000008,0x00000000"
```

TABLE 1-continued

```
    Columns: "serv_loc_prod.status,
    0x00000002,0x00000005,0x00000000"
    Columns: "serv_loc_prod.original_status,
    0x00000002,0x00000005,0x00000000"
    Settings: 2
    MaxRows: 2147483646
)
```

Other embodiments of the invention will be apparent to persons skilled in the relevant art from a consideration of this specification or practice of the invention disclosed herein. Thus, in accordance with the present invention, systems and methods for accessing data distributed on a plurality of databases in an integrated computer system that satisfy the advantages set forth above are disclosed. Although preferred embodiments have been described in detail, it is understood that various changes, substitutions, and alterations may be made herein. It is intended that the specification, and the example, be considered as exemplary only, with the true scope and spirit of the invention being indicated by the following claims.

We claim:

1. A method for accessing data distributed on a plurality of databases, comprising the steps of:

initiating a cross-reference server query that retrieves at least one cross-reference data row;

generating a virtual table having a first result set including said at least one cross-reference data row;

initiating at least one populate query having each of said at least one cross-reference data rows as an argument;

generating a temporary virtual table that populates each cross-reference data row of said result set with data responsive to said populate query; and updating said virtual table with said populated data row.

2. The method of claim 1, wherein said populate query defines a single distributed data set.

3. The system of claim 1, further comprising means for displaying said virtual table.

4. The method of claim 1, further comprising the step of ordering said cross-reference data rows.

5. A system for accessing data distributed on a plurality of databases in an integrated computer system, comprising:

a plurality of databases;

a distributed data port, which (1) initiates a cross-reference server query, (2) generates a virtual table having a first result set including at least one cross-reference data row responsive to said cross-reference server query, (3) initiates at least one populate query each having one of said at least one data rows as an argument, and (4) updates said virtual table with data responsive to said at least one populate query;

a cross-reference server, which receives said cross-reference server query from said distributed data port, identifies at least one of said plurality of databases having at least one of said data rows, and transmits said cross-reference server query to a data directory server; and a temporary virtual table, which relays each of said at least one populate queries to said data directory server;

wherein said data directory server is linked to each of said plurality of databases, locates at least one of said plurality of databases having data responsive to said cross-reference server query and said populate query, retrieves said data, and transmits data responsive to said cross-reference server query to said distributed data port and data responsive to said populate query to a temporary virtual table; and wherein said temporary virtual table populates each of said at least one cross-reference data rows of said result set with data responsive to said populate query and transmits said populated data row to said distributed data port to update said virtual table.

6. The system of claim 5, wherein said populate query defines a single distributed data set.

7. The system of claim 5, wherein said distributed data port includes a orders said at least one data rows according to a comparison code using a generic library sorting method.

8. The system of claim 5, further comprising means for displaying said virtual table.

* * * * *